United States Patent

Chen et al.

[11] Patent Number: 5,087,481
[45] Date of Patent: Feb. 11, 1992

[54] METHOD FOR TEXTURING A MAGNETIC DISK SILICATE GLASS SUBSTRATE

[75] Inventors: Tu Chen, Monte Sereno, Calif.; Toru Iseda; Kazuo Mannami, both of Yokohama, Japan

[73] Assignees: Komag, Inc., Milpitas, Calif.; Asahi Glass Co., Ltd., Tokyo, Japan

[21] Appl. No.: 329,993

[22] Filed: Mar. 29, 1989

Related U.S. Application Data

[63] Continuation-in-part of Ser. No. 105,612, Oct. 8, 1987, Pat. No. 4,833,001.

[30] Foreign Application Priority Data

| Oct. 9, 1986 [JP] | Japan | 61-239249 |
| Dec. 12, 1986 [JP] | Japan | 61-294927 |
| Aug. 4, 1987 [JP] | Japan | 62-193731 |
| Sep. 9, 1987 [JP] | Japan | 62-224034 |

[51] Int. Cl.$^5$ .............................................. G11B 5/00
[52] U.S. Cl. .................................. 427/129; 427/131; 427/430.1; 428/64; 428/65; 428/141; 428/426; 428/694; 428/900; 156/663; 156/646
[58] Field of Search ................. 428/694, 900, 64, 65, 428/426; 156/663, 646; 427/129

[56] References Cited

U.S. PATENT DOCUMENTS

| 3,938,978 | 2/1976 | Hummel | 65/33 |
| 4,274,907 | 6/1981 | Vig et al. | 156/637 |
| 4,833,001 | 5/1989 | Kijima et al. | 428/141 |
| 4,876,117 | 10/1989 | Bornstein | 427/130 |

FOREIGN PATENT DOCUMENTS

| 0263512 | 4/1988 | European Pat. Off. |
| 62-026623 | 7/1987 | Japan |
| 62-252517 | 4/1988 | Japan |
| 63-160013 | 11/1988 | Japan |
| 2179486-A | 3/1987 | United Kingdom |

Primary Examiner—Merrell C. Cashion, Jr.
Assistant Examiner—Stevan A. Resan
Attorney, Agent, or Firm—Skjerven, Morrill, MacPherson, Franklin & Friel

[57] ABSTRACT

A glass disk is subjected to a chemical or gentle mechanical polishing step to remove microcracks or scratches in the disk surface prior to chemically texturing the disk. Thereafter, magnetic media is deposited onto the glass disk. We have discovered that by performing this pre-texturing polishing step, we can avoid the phenomenon of "linkage bumps," which could otherwise cause the resulting magnetic disk to fail a glide-type test or to cause a read/write head crash.

17 Claims, 5 Drawing Sheets

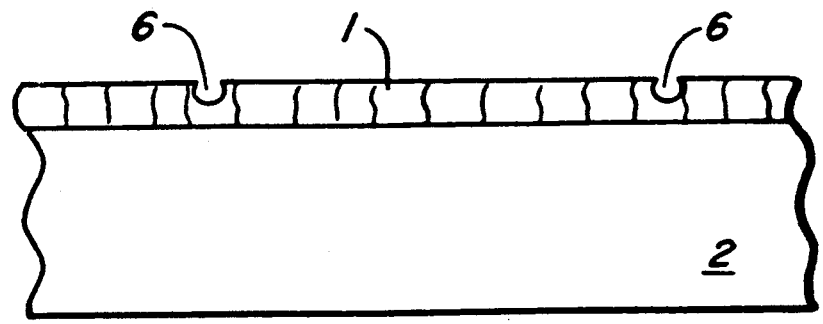
FIG._1.
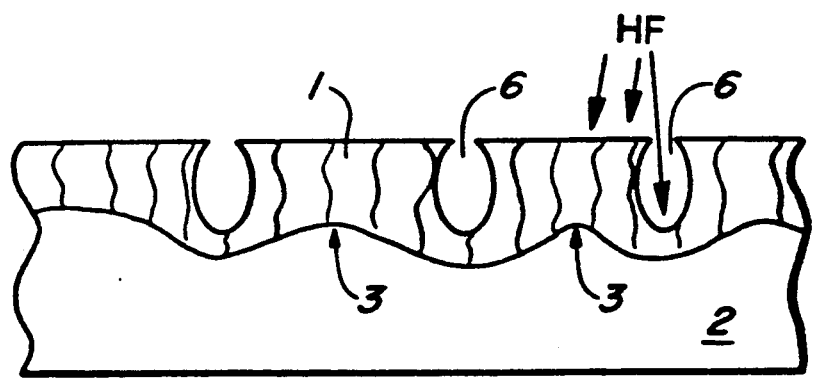
FIG._2.
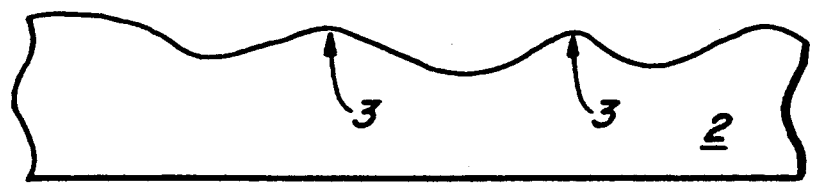
FIG._3.

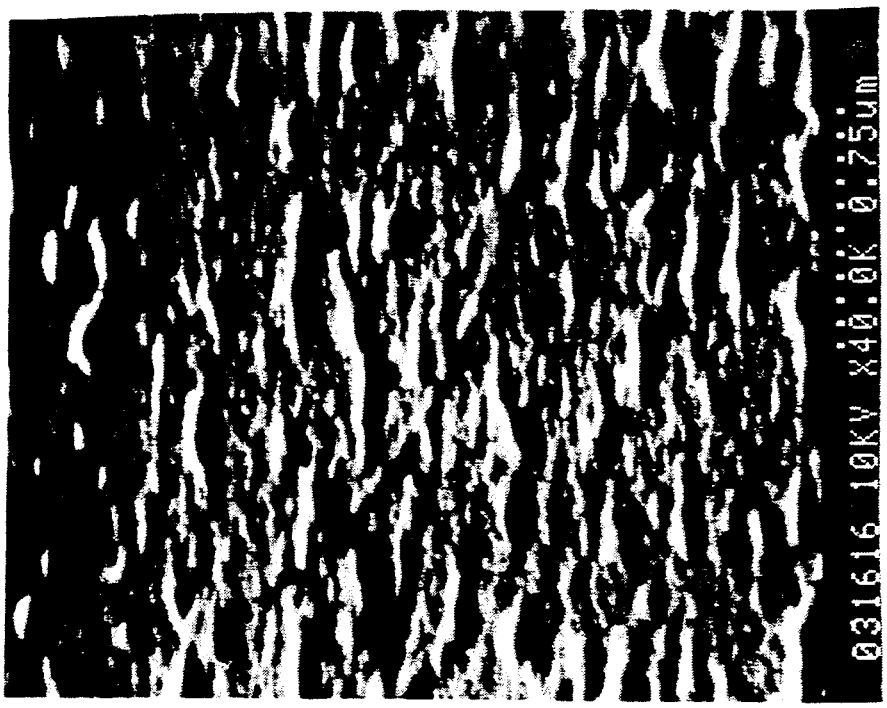
FIG._7
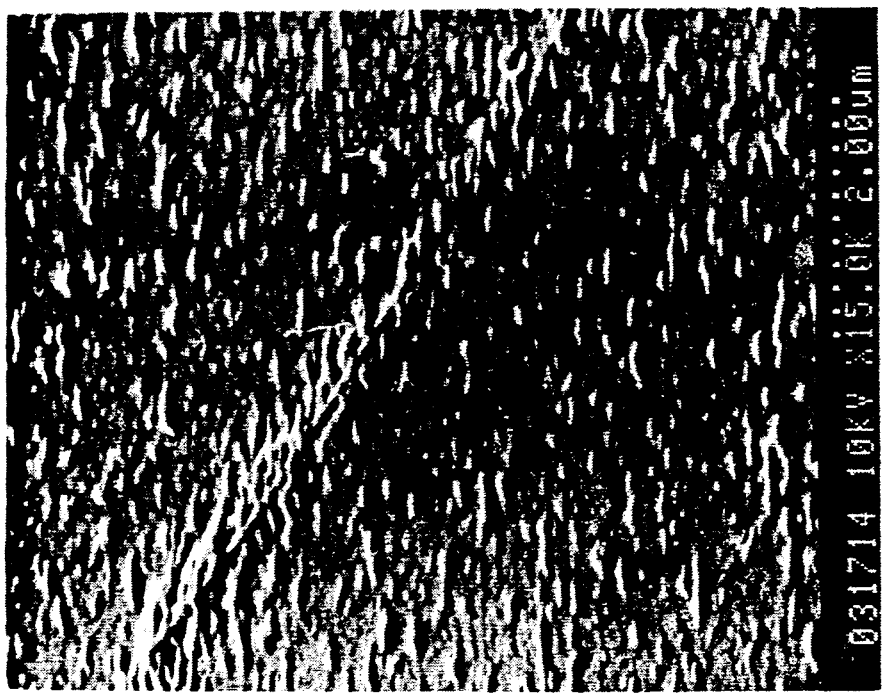
FIG._4

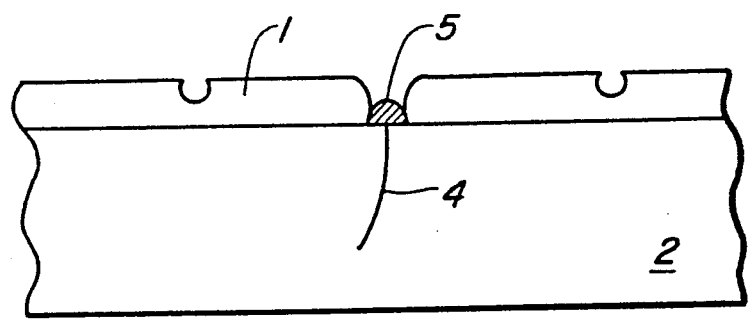
FIG._5a.
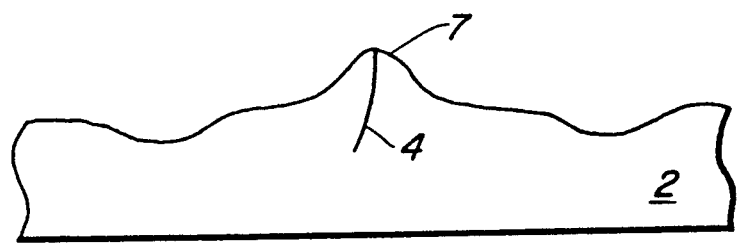
FIG._5b.
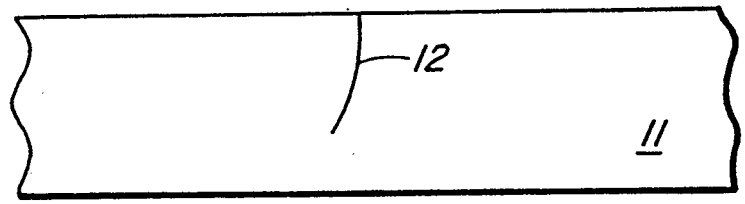
FIG._6a.
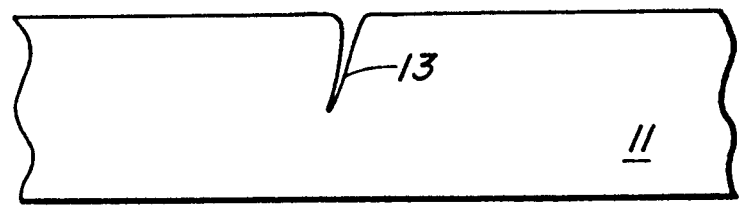
FIG._6b.

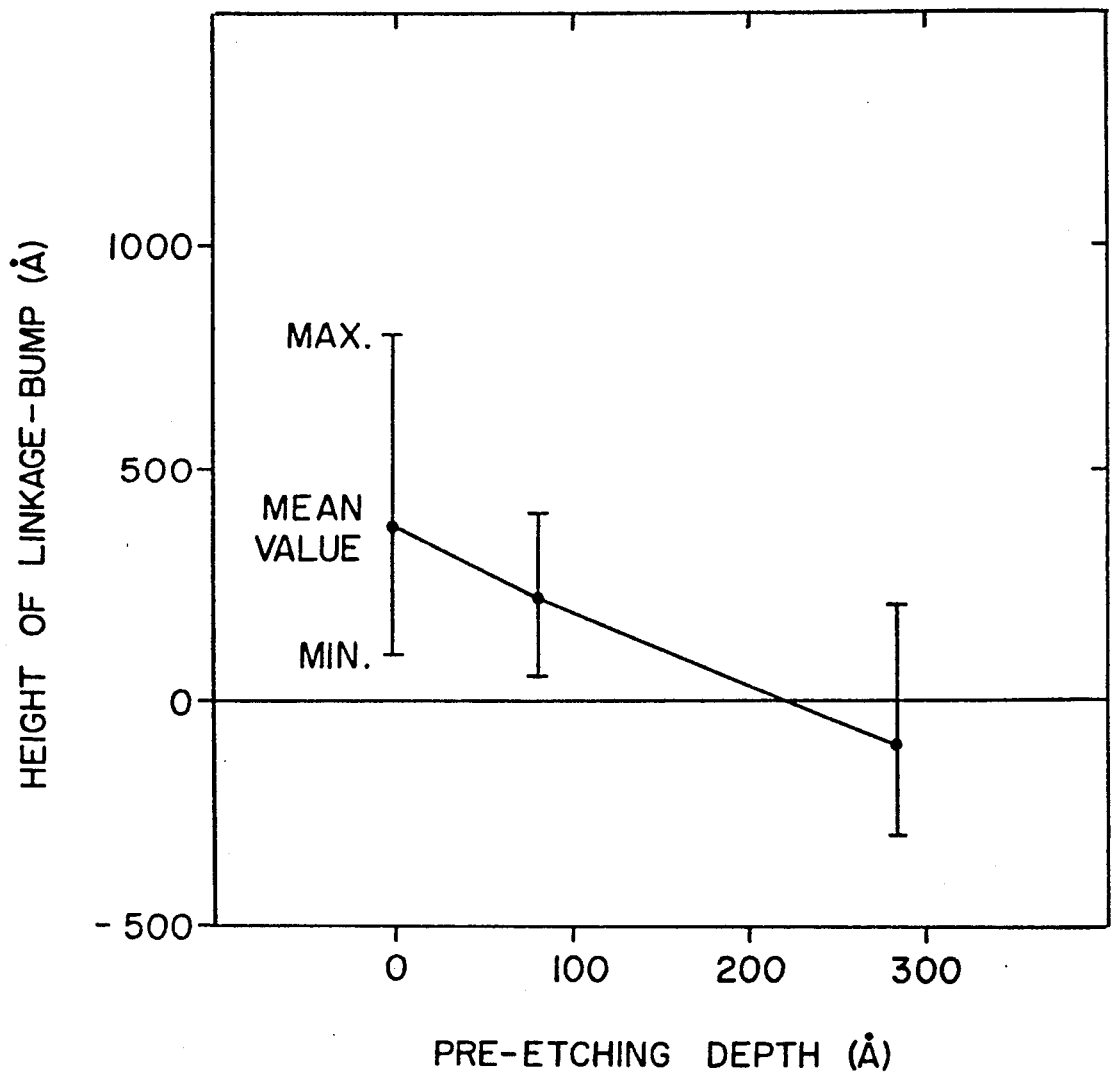
FIG._8.

FIG._10
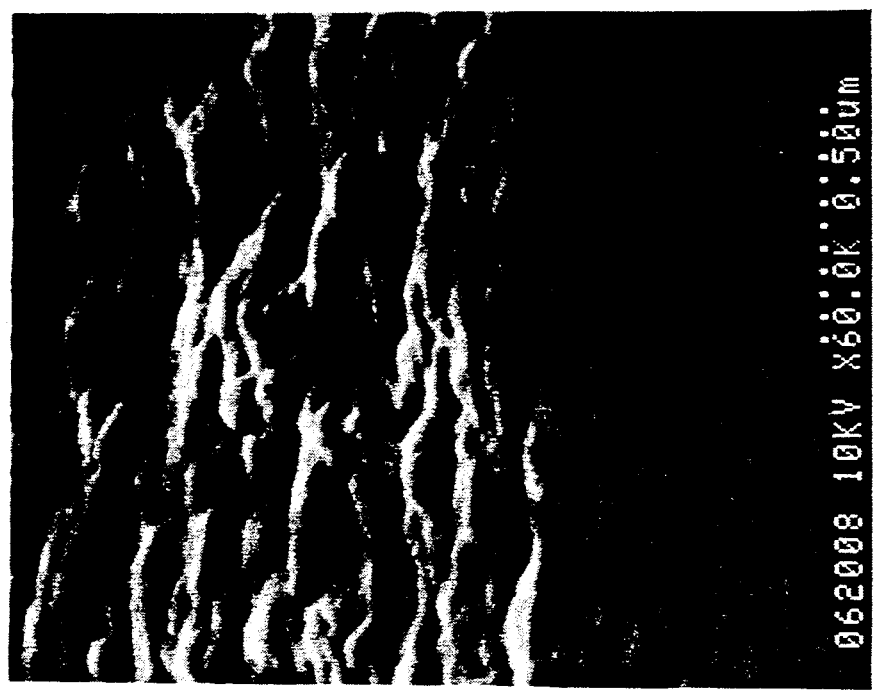
FIG._9

METHOD FOR TEXTURING A MAGNETIC DISK SILICATE GLASS SUBSTRATE

CROSS-REFERENCE TO RELATED APPLICATION

This application is a continuation in part of U.S. patent application Ser. No. 07/105,612 U.S. Pat. No. 4,833,001 filed Oct. 8, 1987 and incorporated entirely herein by reference.

BACKGROUND OF THE INVENTION

This invention relates to methods for texturing glass substrates used in conjunction with magnetic disks.

One method for manufacturing a magnetic disk comprises the steps of texturing a glass substrate, depositing a magnetic film on the glass substrate, depositing a protective layer on the magnetic film, and applying a lubricant to the protective layer. One reason for texturing the substrate is to reduce the friction between the magnetic disk and a read/write head used in conjunction with the disk. The above-incorporated U.S. patent application Ser. No. 07/105,612 U.S. Pat. No. 4,833,001 discloses a method for texturing a glass substrate using chemical etching. During chemical etching, the glass substrate is subjected to either a gaseous or aqueous etching medium comprising HF.

FIG. 9 is a SEM photograph of a portion of a glass surface etched by a gaseous etching medium. Porous reaction products having a thickness almost equal to the etching depth form on the surface which consist of fluorides and contain very little silicon. It is believed that the major component of the glass (the silicon atoms) reacts with the etchant and forms gaseous $SiF_4$, which is released from blowholes which dot the etched glass surface.

We theorize that during HF etching, a porous chemical compound barrier (e.g., material 1 in FIG. 1, which consists of a skeletal or sponge-like compound) and blowholes 6 form on the surface of glass substrate 2. Barrier material 1 acts as a permeable mask during chemical etching. As a result, as etching proceeds, mountains 3 are formed beneath material 1 (see FIG. 2) and valleys form below blowholes 6. Material 1 is removed after etching by rinsing substrate 2 with water, thereby leaving the profile illustrated in FIG. 3.

At the conclusion of the etching process, mountains 3 generally have a height less than or equal to about 700Å at a reference length of 250 μm and greater than or equal to about 50Å at a reference length of 50 μm. (The term "reference length" is also known as a "standard length", which is defined in Japanese Industrial Standard B 0601-1982 "Definitions and Designations of Surface Roughness", incorporated herein by reference, and in the '612 patent application.) The mountain pitches are between 0.1 and 50 μm.

We have discovered that if prior to etching, glass substrate 2 includes a microcrack (also known as a latent crack in the glass industry) or scratch, after subjecting the disk to an HF chemical etchant, the disk surface will include excessively high mountains around the microcrack or scratch such as the mountains illustrated in the SEM photograph of FIG. 4, which is observed with a 75° tilt angle. These mountains (hereinafter referred to as "linkage bumps") have a height greater than the height of the other mountains on the substrate surface and can cause the resulting magnetic disk to fail a glide height test. In addition, if a read/write head used in conjunction with the resulting magnetic disk repeatedly strikes a linkage bump during head flight or contact start-stop operations, a head crash can result. Also, the presence of linkage bumps affects the static friction coefficient ($\mu s$) exhibited by the resulting magnetic disks.

FIG. 10 is a SEM photograph of the section of a glass surface with a scratch which was etched by a gaseous etching medium. Thick reaction products (e.g. masking material 1) are not formed over the scratch.

We theorize that during chemical etching, masking material 5 (which is different in characteristics from that of masking material 1) tends to accumulate in the vicinity of microcracks such as microcrack 4 (see FIG. 5a). Masking material 5 masks the glass from the etchant more efficiently than masking material 1 elsewhere on the disk surface, thereby forming linkage bump 7.

Sufficiently high mountains 3 (FIG. 3) can be attained under certain etching conditions without forming chemical compound barriers which result in formation of high linkage bumps. However, these etching conditions tend to decrease the surface density of mountains 3. Accordingly, it would be desirable to eliminate the microcracks or scratches from the disk to prevent linkage bump formation.

SUMMARY

Prior to chemically texturing a glass substrate, the glass substrate is subjected to an extra step of a gentle, mechanical polishing process or a pre-etch chemical polishing process or a combination of both to eliminate microcracks or change the morphology of microcracks in the substrate surface and to thereby eliminate or reduce the problem of linkage bumps.

BRIEF DESCRIPTION OF THE DRAWINGS

FIGS. 1 to 3 illustrate in cross section a glass substrate during the etching process described in U.S. patent application Ser. No. 07/105,612 U.S. Pat. No. 4,833,001.

FIG. 4 is a SEM photograph with a 75° tilting angle of a linkage bump formed on the surface of a glass substrate.

FIGS. 5a and 5b illustrate a glass substrate including a microcrack which we theorize results in two different types of etching masks.

FIGS. 6a and 6b illustrate in cross section a substrate including a microcrack before and after a pre-etch chemical polishing step.

FIG. 7 is a SEM photograph with a 75° tilting angle, of a glass substrate which was textured after a pre-etch chemical polishing step, and which does not have a high linkage bump.

FIG. 8 illustrates the effect of the etching depth resulting from a pre-etch chemical polishing step on the height of linkage bumps.

FIGS. 9 and 10 show reaction products which are formed on the glass surface during texturing by chemical etching.

DETAILED DESCRIPTION

During a process in accordance with the present invention, a glass substrate is polished and textured. The glass substrate can have a composition such as discussed in the above-incorporated U.S. patent application Ser. No. 07/105,612 U.S. Pat. No. 4,833,001 or a composition as discussed in U.S. patent application Ser. No.

07/230,210, filed Aug. 9, 1988, also incorporated herein by reference. After texturing, a magnetic alloy, e.g., a cobalt alloy or an iron alloy, is sputtered onto the substrate or alternatively onto a non-magnetic underlayer such as chromium or a nickel-phosphorus alloy underlayer, which is deposited on the glass substrate prior to the deposition of the magnetic alloy. Thereafter, a hard protective layer such as a hard carbon layer is formed on the magnetic alloy.

Prior to chemical etching, the outer edge of the substrate is washed carefully. If this washing step is not performed, glass chips come off the substrate edges during a mechanical polishing step, described below, thereby forming microcracks or scratches and then forming linkage bumps. Thereafter, the substrate is subjected to mechanical polishing, e.g., using a soft polyurethane polish pad such as DOMY, manufactured by Dai-Ichi Lace Mfg. Co., Ltd. of Kyoto, Japan, used in conjunction with $CeO_2$ particles having an average diameter of 1.0 micronsor less, under a pressure of 30 to 70 grams/$cm^2$. The polishing apparatus used for this step can be machine model number MDS-13015P4 or SFPL-168-5P, each manufactured by Speedfam Co., Ltd. Alternatively, device number DSPM-1200M manufactured by Toshiba Machine Co. can also be used. In the alternative, the disk can be subjected to a pre-etch chemical polishing step in which the glass substrate is placed in a pre-etching solution comprising 0.01 to 1 wt % $H_2SO_4$ and 0.01 to 0.2 wt % HF. The disks are typically placed in this solution for 2 to 10 minutes at room temperature. In the alternative, the substrate can be subjected to a pre-etch chemical polishing step, and then to a mechanical polishing step as described above.

FIGS. 6a and 6b illustrate a glass substrate 11 including a microcrack 12 before and after being placed in a pre-etch chemical polishing solution. During the pre-etch chemical polishing, approximately 60Å to 500Å of the glass are removed. Even though a valley 13 remains at the location of original microcrack 12 after pre-etch chemical polishing, because of the morphology change from microcrack 12 to gentle valley 13, masking material 5 does not accumulate as severely at valley 13 to leave an undesirably high mountain after the texturing step.

Thereafter, the disks are removed from the polishing apparatus or solution and subjected to a chemical texturing step as discussed in above-incorporated U.S. patent application Ser. No. 07/105,612 U.S. Pat. No. 4,833,001. Of importance, we have discovered that by processing glass substrates in this manner, the post-etch polishing step discussed at page 26, line 19 to page 27, line 2 of the 07/105,612 patent application Ser. No. now U.S. Pat. No. 4,833,001 can be omitted.

FIG. 7 illustrates a SEM photograph, with a 75° tilting angle, of a textured glass disk after the chemical texturing process. Because of the pre-texturing chemical or mechanical polishing step, the substrate of FIG. 7 includes no high linkage bumps.

FIG. 8 illustrates the relation between the height of linkage bumps and the amount of glass removed during the pre-etch chemical polishing step. The glass substrates used for these experiments were polished with coarse $CeO_2$ powder (mean particle diameter of 2 microns) without the above-described gentle mechanical polishing process. For the substrate without pre-etch chemical polishing, after chemical texturing, linkage bumps of 100Å to 800Å height and an average height of 390Å were found on the substrate surface (see the Comparison Test in Table 1 below).

Referring again to FIG. 8, another substrate was subjected to a pre-etch chemical polishing step (after mechanical polishing with coarse $CeO_2$) during which the substrate was etched to a depth of 80Å by soaking the substrate in a solution comprising 0.05 wt % HF and 0.05 wt % $H_2SO_4$ for 6 minutes at 35° C. After chemical texturing, no linkage bumps exceeding a height of 400Å were found, and the average height of the linkage bumps was about 200Å.

For the substrate which was subjected to a pre-etch chemical polishing step during which 280Å of glass was removed, no linkage bumps higher than 200Å were found after texturing. This substrate (shown in FIG. 7) was used to generate the test data for Test 1 in Table I below.

Table I contains data concerning the heights of linkage bumps formed on glass substrates after chemical texturing. The tests in Table I were performed by using glass substrates made of sodium borosilicate glass containing about 72% by weight of $SiO_2$. The outer diameter and thickness of the disks were 130 mm and 1.9 mm, respectively. For Test 1 and the comparison test, the disks were processed as described above. Chemical texturing was accomplished by blowing nitrogen gas including 0.2% by volume HF and 0.2% by volume $H_2O$ for two minutes against the dry glass substrate heated to approximately 40° C. The substrate was then washed and dried, and data concerning linkage bumps was taken. Thereafter, a Co-Ni-Pt magnetic alloy layer and a hard carbon protective film were formed on the substrate by sputtering, and lubricant was applied to the carbon film. Contact-start-stop ("CSS") tests were then performed to measure the static friction coefficient between a read-write head and the magnetic disk.

TABLE I

| | Height of Linkage Bumps | | Number of Linkage Bumps or grooves per $mm^2$ | Static Friction after 1000 CSS Cycles | |
|---|---|---|---|---|---|
| | Average | Maximum | | Average $\mu s$ | Maximum $\mu s$ |
| Test 1 | −100Å | 200Å | 40 | 0.26 | 0.42 |
| Test 2 | 270Å | 500Å | <1 | 0.35 | 0.46 |
| Test 3 | 100Å | 150Å | <1 | 0.25 | 0.39 |
| Comparison Test | 390Å | 800Å | 150 | 0.49 | 0.8 |

As Table 1 shows, the static friction coefficient after 1000 CSS test cycles was less than 0.5 in Test 1. On the other hand, there were many cases in which the static friction coefficient was greater than 0.5 after 1,000 CSS cycles in the comparison test of Table I. Of importance, it is desirable to minimize static friction, e.g. to a value less than 0.5.

If one can lower the flying height of the read/write head, the recording density for the resulting magnetic disk will be much higher. To accomplish this result, it is necessary to eliminate asperities having a height greater than 0.05 $\mu m$ (500Å). We have found grooves of a 300Å depth on the substrate surface that was pre-etched 280Å by depth. We confirmed that the presence of these grooves did not influence the flying stability of the read/write head.

Other test results are set forth in Table 1. The substrate in Test 2 was subjected to the coarse mechanical polishing described above, then a gentle mechanical polishing step as described above, cleaned, dried thoroughly and then chemically textured. The substrate in Test 3 was polished in the same way as in Test 2 and was subjected to an additional chemical polishing step during which the substrate was pre-etched to a 280Å depth. Thereafter, the substrate was cleaned, dried and then chemically textured.

Though CSS tests are usually performed by repeatedly accelerating a magnetic disk from a stationary position to a rotational speed of 3,600 RPM, to collect the data at Table I, we examined these disks using a 300 RPM CSS test as an accelerated test method. Disks having a static friction coefficient more than 0.5 were considered unacceptable.

The number of linkage-bumps in Tests 2 and 3 was reduced remarkably due to the gentle mechanical polishing step and the static friction coefficient was low enough to be acceptable. For the substrate which was subjected to the additional chemical pre-etching in Test 3, linkage bumps more than 150Å in height could not be found.

For the comparison tests, mechanical wear marks were observed by an optical microscope where the read/write head impacted the disks during the CSS tests. On the other hand, no wear marks were found in the disks of Tests 1 to 3.

While the invention has been described with regard to a specific embodiment, those skilled in the art will recognize that changes can be made in form and detail without departing from the spirit and scope of the invention. For example, an $H_2SO_4$ concentration between 0.01 and 10 wt. %, and an HF concentration between 0.01 and 1 wt. % can be used. The etching time may be between 30 seconds and 10 minutes, and the temperature of the solution may be between 10° C. and 40° C. In addition, a NaOH aqueous solution, an $NH_4F$ aqueous solution, an HF aqueous solution, an $H_2SiF_6$ aqueous solution, or other glass etchant solution can be used in place of a $HF-H_2SO_4$ solution. Accordingly, all such changes come within the present invention.

We claim:

1. A method for texturing a silicate glass substrate used to manufacture a magnetic disk comprising the steps of:
   subjecting said substrate to a polishing step to eliminate or substantially reduce the number of microcracks in the surface of said substrate; and
   texturing said substrate by subjecting said substrate to a chemical etchant.

2. Method of claim 1 wherein said polishing step is a mechanical polishing step.

3. Method of claim 1 wherein said polishing step is a chemical polishing step.

4. Method of claim 3 wherein said polishing step is a chemical polishing step following a mechanical polishing step.

5. Method of claim 3 wherein said step of chemical polishing comprises the step of etching said substrate to a depth less than or equal to about 1 μm.

6. Method of claim 1 wherein said texturing step comprises the step of contacting an aqueous solution containing a fluorine compound to the substrate surface.

7. Method of claim 1 wherein said texturing step comprises the step of contacting a gas containing hydrogen fluoride to the substrate surface.

8. Method of claim 1 wherein said polishing step prevents substantially all linkage bumps having heights greater than about 500Å from forming.

9. Method of claim 1 further comprising the step of depositing a magnetic alloy film on said substrate after said step of texturing.

10. Method of claim 9 further comprising the step of depositing a non-magnetic underlayer on said substrate prior to said step of depositing a magnetic alloy film.

11. Method of claim 1 further comprising the step of washing said substrate prior to said step of subjecting said substrate to said polishing step.

12. Method of claim 11 further comprising the step of depositing a magnetic alloy film on said substrate after said step of texturing.

13. Method of claim 12 further comprising the step of depositing a non-magnetic underlayer on said substrate prior to said step of depositing a magnetic alloy film.

14. Method of claim 1 wherein said step of subjecting said substrate to a polishing step comprises the step of placing said substrate in a pre-etching solution comprising 0.01 to 10 wt. % $H_2SO_4$ and 0.01 to 1 wt % HF.

15. Method of claim 1 wherein said step of subjecting said substrate to a polishing step comprises the step of mechanically polishing said substrate with polishing particles having an average diameter less than or equal to about one micron, under a pressure of about 30 to 70 grams/cm$^2$.

16. Method of claim 1 wherein said step of subjecting said substrate to a polishing step comprises the step of immersing said substrate in a solution comprising a material selected from the group consisting of NaOH, $NH_4F$, HF, and $H_2SiF_6$.

17. Method of claim 1 wherein said step of subjecting said substrate to a polishing step comprises the step of substantially eliminating microcracks from said substrate.

* * * * *